March 11, 1941. C. A. STEMME Re. 21,748

TEMPERATURE CONTROLLED CONTAINER

Original Filed May 27, 1939

INVENTOR.
Charles A. Stemme

BY William B. Jaspert.
ATTORNEY.

Reissued Mar. 11, 1941

Re. 21,748

UNITED STATES PATENT OFFICE 21,748

TEMPERATURE CONTROLLED CONTAINER

Charles A. Stemme, Large, Pa.

Original No. 2,223,234, dated November 26, 1940, Serial No. 276,135, May 27, 1939. Application for reissue January 4, 1941, Serial No. 373,184

3 Claims. (Cl. 62—89)

Figure 1:
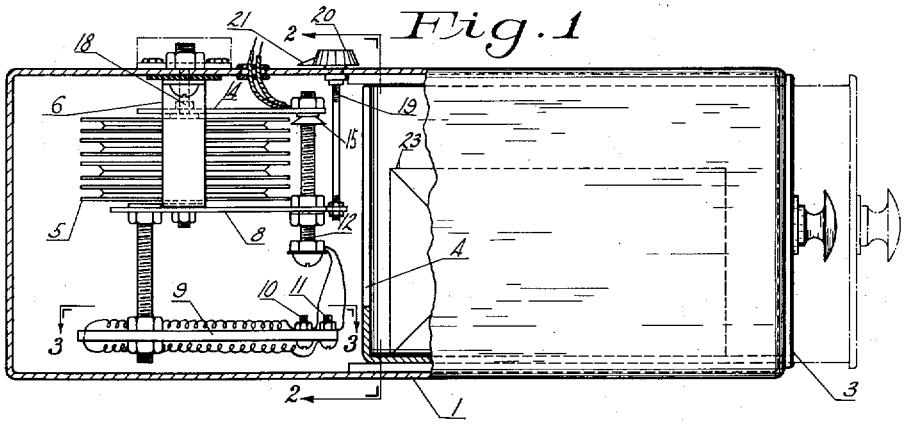

This invention relates to new and useful improvements in temperature controlled containers for use in built-in compartments or separate units for refrigerators.

It is among the objects of the invention to provide a compartment for use in refrigerators for maintaining temperatures independently of the temperature conditions of the main refrigerator compartment.

Another object of the invention is the provision of a controllable temperature compartment for refrigerators which shall embody means for both heating and cooling such compartment in response to temperature conditions prevailing therein.

The invention further contemplates adjustable means for regulating the temperature in such compartments.

Figure 2:
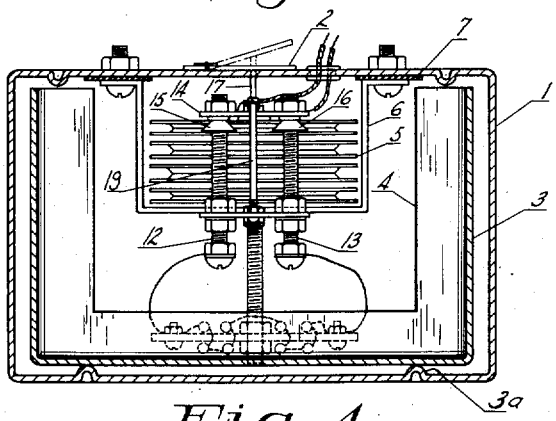
Figure 3:
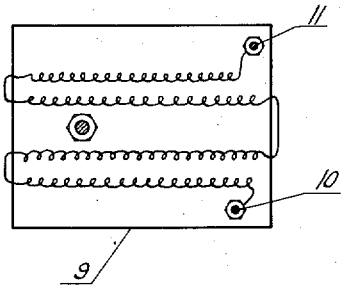
Figure 4:
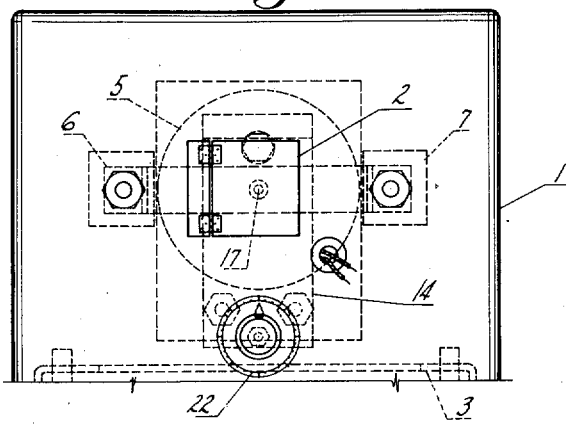

The invention will become more apparent from a description of the accompanying drawing constituting a part hereof in which like reference characters designate like parts and in which:

Fig. 1 is a side elevational view partially in section of a temperature controlled refrigerator unit embodying the principles of this invention;

Fig. 2 a cross-sectional view thereof partially in elevation taken along the line 2—2, Fig. 1;

Fig. 3 a top plan view of a heating element for use in the unit of Figs. 1 and 2;

Fig. 4 a partial plan view of the unit shown in Fig. 1; and

Figure 5:
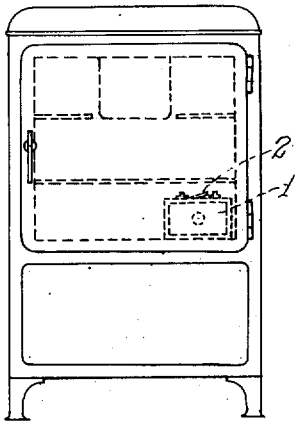

Fig. 5 a front elevation of a domestic type unit.

With reference to the several figures of the drawing, the structure therein illustrated comprises a housing 1 which may be a built-in compartment of a refrigerator chamber or a separate unit adapted to be placed in a refrigerator, or even externally thereof, having communication with the refrigerator chamber through a trap door 2, one end of the compartment 1 being provided with a drawer 3 having a cut-out end wall 4 which is slidable on a track 3a or on the bottom of the housing 1, the drawer extending part-way into the compartment as shown in Fig. 1.

A temperature controlling device is mounted in the end chamber of the housing 1 and consists of a bellows type thermostat 5 that is mounted by a bracket 6 from the top wall of the housing 1, it being insulated therefrom by insulating material or strips 7. Mounted on the bracket 6 is a plate 8 from which is supported an electrical resistance heating element generally designated by the numeral 9, the element having terminals 10 and 11 connected to terminal bolts 12 and 13 on the bracket plate 8. The upper part of the bellows is free to move in response to expansion or contraction of the bellows 5, and carries an insulating strip 14 on which terminals 15 and 16 are mounted. The strip 14 also carries a pin or push rod 17 that acts to raise the trap door 2 as shown in Fig. 2. The strip 14 is flexible and is fastened at the center of the thermostat at 18, its free end carrying the terminals 15 and 16. An adjusting screw 19 is secured to the strip 8 which is also flexible insulating material, and is provided with a dial 20 having a pointer 21 that registers with calibrations 22, Fig. 4, for indicating temperatures.

The numeral 23 in the drawer 3 designates a pack of butter or other foodstuffs that may be kept in the compartment under predetermined temperature conditions.

The above described temperature controlled unit operates briefly as follows. With the unit placed in a refrigerator compartment as shown in Fig. 5, the thermostat 5 which is filled with an expansible gas will expand or contract in accordance with temperature changes within the compartment. If the temperature drops below a predetermined value, the bellows will contract until terminals 15 and 16 contact the terminal bolts 12 and 13 which energizes the resistance heater 9 to generate heat. When the compartment has reached a predetermined temperature, the bellows by expansion will break the terminal connections 15 and 16 with the bolts 12 and 13, and if the temperature within the chamber exceeds the predetermined amount, the bellows continuing to expand will raise the trap door 2 thereby establishing communication of the small chamber with the chamber of the refrigerator permitting the cold air to enter the compartment of the small unit to reduce the temperature.

By adjusting the dial 20 the terminals 12 and 13 are set to vary their distance from the terminal posts 15 and 16 so that more or less expansion or contraction of the bellows 5 is necessary to energize the resistance heater 9.

The separate temperature controlled compartment is useful in maintaining foodstuffs at different temperatures than the normal temperature of a refrigerator compartment such as, for example, butter, which by means of the invention may be maintained at a spreading temperature.

I am aware that such temperature controlled units have been heretofore proposed, but none of them embody positive means for both increasing or decreasing the temperature by means of a thermostat or temperature responsive mechanism.

Although one embodiment of the invention has been herein illustrated and described, it will be apparent to those skilled in the art that various modifications may be made in the details of construction without departing from the principles herein set forth.

I claim:

1. In a domestic refrigerator, the combination of a main food storage chamber and a relatively small auxiliary food storage compartment disposed within said main food storage chamber, said compartment having an extensible and contractible temperature responsive device therein, and having a valved passage communicating with the main food storage compartment of the refrigerator, and being further provided with a heating element, means connected to be operative by the temperature responsive device for opening and closing the valve controlling the passage between the main refrigerator chamber and the auxiliary chamber, and means actuated by said temperature responsive device for energizing and deenergizing said heating element, said valve and temperature controlling means being arranged to be alternately operative by the temperature responsive device so as to establish communication between said main and auxiliary chambers in the extended position of said temperature responsive device and for heating said auxiliary chamber in the contracted position thereof, and said auxiliary chamber being of small volume relative to the said main refrigerator compartment so as not to materially affect the temperature of the main compartment when the communicating passage is opened.

2. In a refrigerator for the storage of food, a main food storage chamber and an auxiliary food storage compartment within said main food storage chamber, a partition dividing said compartment from said chamber, said partition having a movable closure which, when opened, permits circulation between said compartment and chamber, and temperature responsive means in said auxiliary compartment for actuating said closure to open and close the same in response to temperature changes in said auxiliary compartment.

3. In a refrigerator for the storage of food, a main food storage chamber and an auxiliary food storage compartment within said main food storage chamber, a partition dividing said compartment from said chamber, said partition having a movable closure which, when opened, permits circulation between said compartment and chamber, temperature responsive means in said auxiliary compartment comprising a bellows, and means engaging said closure member operative by movement of said bellows for raising and lowering said closure in response to expansion and contraction of said bellows, the said bellows including a temperature responsive medium for expanding and contracting the same.

CHARLES A. STEMME.